United States Patent [19]

Haskell

[11] 3,962,535
[45] June 8, 1976

[54] CONDITIONAL REPLENISHMENT VIDEO ENCODER WITH SAMPLE GROUPING AND MORE EFFICIENT LINE SYNCHRONIZATION

[75] Inventor: Barin Geoffry Haskell, New Shrewsbury, N.J.

[73] Assignee: Bell Telephone Laboratories, Incorporated, Murray Hill, N.J.

[22] Filed: Apr. 25, 1975

[21] Appl. No.: 571,531

[52] U.S. Cl. .............................. 178/6; 178/DIG. 3; 179/15.55 R; 325/38 B
[51] Int. Cl.² ........................................... H04N 7/12
[58] Field of Search ................... 178/DIG. 3, 6, 6.8; 179/2 TV, 15.55 R; 325/38 B

[56] References Cited
UNITED STATES PATENTS

| | | | |
|---|---|---|---|
| 3,347,981 | 10/1967 | Kagan | 178/DIG. 3 |
| 3,378,641 | 4/1968 | Varsos | 179/15.55 R |
| 3,553,361 | 1/1971 | Mounts | 178/6 |
| 3,553,362 | 1/1971 | Mounts | 178/6 |
| 3,571,505 | 3/1971 | Mounts | 178/6.8 |

*Primary Examiner*—Howard W. Britton
*Attorney, Agent, or Firm*—Daniel D. Dubosky

[57] ABSTRACT

A video sample is selected for transmission only if it differs significantly in amplitude from the sample corresponding to the same spatial point in a previous video frame. An address word which indicates by its value the position of a sample within a video line is transmitted prior to the amplitude of a sample only if the previous sample was not selected for transmission. The amplitudes for selected samples are transmitted in groups preceded by an address word and terminated by a flag word. Frame synchronization is maintained by transmitting a first sync word during the vertical blanking interval. Ordinarily, the first sample in a video line selected for transmission has an address which is lower in value than the address word of the previous sample selected for transmission and, therefore, no line synchronization is necessary. The number of video lines in which no samples are selected for transmission is determined by a counting circuit and this number is transmitted in the form of a sequence of bits following the address word of the first sample selected for transmission in a video line. A second sync word is selected for transmission during the horizontal blanking interval when the counter reaches a predetermined value. To account for those rare instances when the address word of the first selected sample in a video line is higher in value than the address word of the preceding selected sample, a third sync word is transmitted prior to the address word of the first selected sample. In video-telephone systems line synchronization is thus achieved at a cost of slightly more than one bit per video line.

16 Claims, 6 Drawing Figures

CONDITIONAL REPLENISHMENT VIDEO ENCODER WITH SAMPLE GROUPING AND MORE EFFICIENT LINE SYNCHRONIZATION

BACKGROUND OF THE INVENTION

This invention relates to redundancy reduction systems and, more particularly, to a redundancy reduction system for use with video signals.

Video signals of the type generated in connection with a video telephone service tend to contain a large amount of redundancy on a frame-to-frame basis. In U.S. Pat. No. 3,553,361, issued to F. W. Mounts on Jan. 5, 1971, a redundancy reduction system is described in which a video amplitude sample is transmitted to a receiving location only if that sample differs significantly from a corresponding stored sample having the same position in a previous video frame. This type of redundancy reduction system is known to those skilled in the art as a conditional replenishment video system. In order to enable the receiver to insert the sample into the proper location in a receiver frame memory, a position or address code is transmitted along with the amplitude value for a selected sample, followed by the amplitude values for the samples in succeeding address locations providing that these succeeding samples are also selected for transmission. Transmission of a group of samples is terminated by transmitting a flag word whose value is distinguishable from all amplitude values. The number of bits necessary to identify the position of an amplitude sample within the video frame is reduced to the number of bits which are necessary to locate a sample within a single video line. Synchronization between transmitting and receiving locations is maintained by transmitting at the end of each line and at the end of each frame sync words whose values are distinguishable from all address codes. Thus, a sync word equal in size to an address word is transmitted for each line of the video signal.

SUMMARY OF THE INVENTION

The number of bits required for synchronization purposes in a redundancy reduction system used to process video signals is further reduced in accordance with the present invention wherein no sync word is transmitted to achieve line synchronization. As in prior art circuits, the address word used to locate selected samples has a value which indicates the position of the selected samples within the video line only. Ordinarily, the fact that a new line has begun can be determined at the receiving location solely by the fact that the address word for the first selected sample in a video line has a particular value relationship to the address word of the selected sample from a preceding video line. Where the address word is higher in value for samples that appear later in the scanning line, the address word for the first selected sample in a video line is ordinarily lower in value than that of the preceding sample. To indicate the number of video lines in which no samples have been selected for transmission, these video lines are counted and the value of the count is transmitted as a sequence of bits following the address word of the first selected sample in a video line. To account for those rare instances during which the first selected sample in a video line has an address word which is higher in value than the address word of the last selected sample in a previous video line, a special distinguishable sync word is transmitted in those instances during the bit intervals preceding the address word of the first selected sample in the video line.

In accordance with a feature of the present invention, the bit sequence utilized to indicate the number of video lines not having selected samples is prevented from occupying more than a predetermined number of bit spaces. The counter utilized to count the number of video lines not having selected samples provides an energizing signal when a predetermined number of lines have been counted. This energizing signal is utilized to transmit a second special distinguishable sync word during the horizontal blanking interval and also is utilized to reset the apparatus in the same way as it is reset during the vertical blanking interval at the beginning of a new frame.

BRIEF DESCRIPTION OF THE DRAWING

The operation of the invention will be more readily understood when the following detailed description is read in conjunction with the drawing in which.

DETAILED DESCRIPTION

Figure 1:
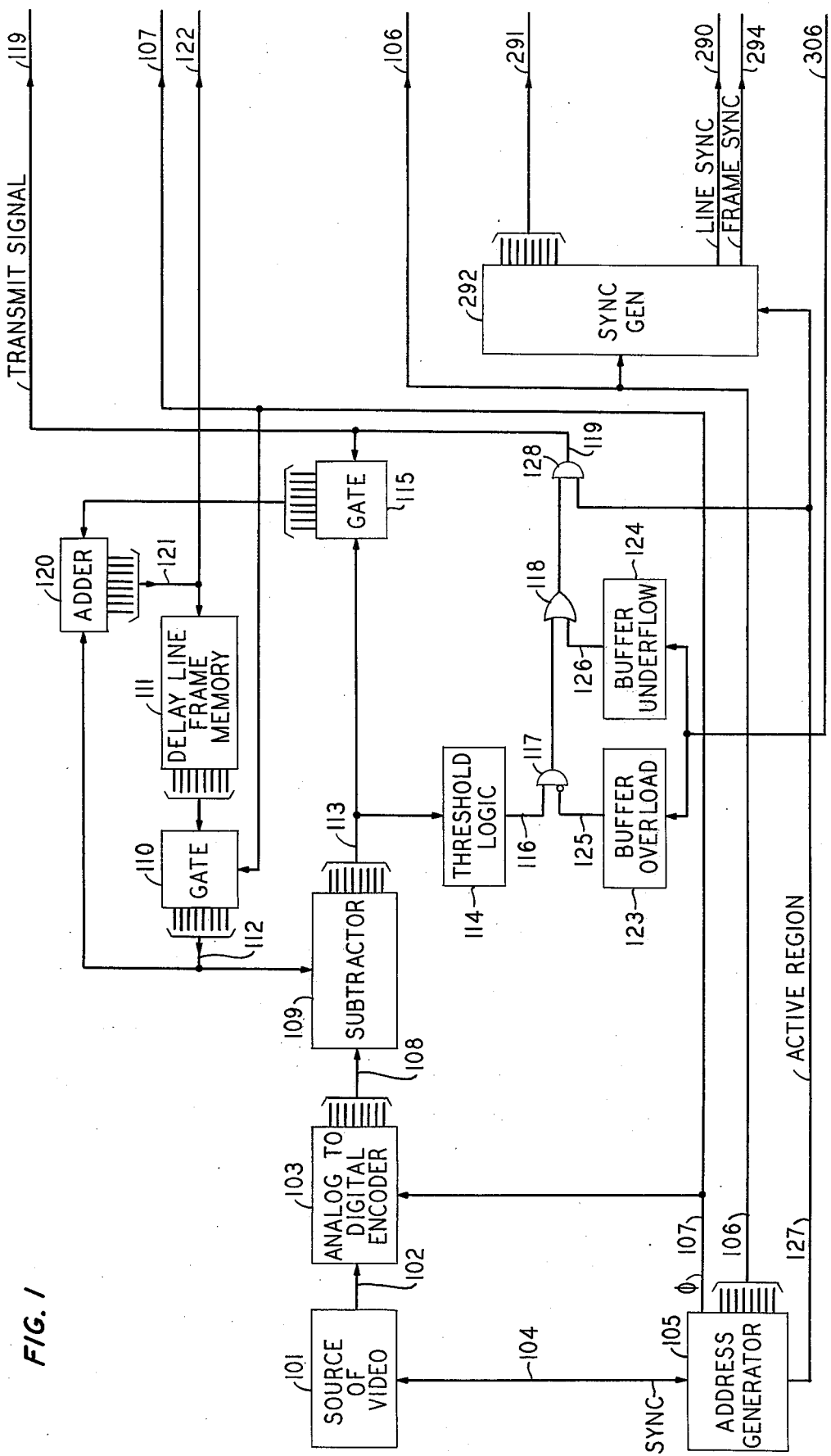
FIGS. 1, 2, and 3, when joined as shown in FIG. 6, by connecting the identically designated lines (with FIG. 1 to the left of FIG. 2, FIG. 2 to the left of FIG. 3), show a schematic block diagram of the present invention.

In FIG. 1 a source of video 101 provides a video signal on line 102 to the input of an analog-to-digital encoder 103. This video signal may be of the standard type with line information interspersed with horizontal and vertical blanking intervals. The source of video 101 may be located in a location remote from the remainder of the apparatus shown on FIG. 1, but even when this source is in a remote location, a synchronization link by way of line 104 is maintained between source 101 and an address generator 105. The synchronization provided by way of line 104 may originate in either the location of the source 101 or the location of address generator 105. Synchronization is maintained by way of line 104 such that address generator 105 provides an address digital word on bus 106 whose value designates the position along a video line of the signal value presented at the output of source 101 on line 102. Bus 106, like all of the other lines which are designated hereinafter as buses, is actually constructed of several transmission paths in parallel with one path for each bit of the digital word said to be carried by the bus. In addition, an energizing pulse is provided by address generator 105 on line 107 for each address word generated on bus 106. These pulses on line 107 are designated in the drawing as pulse train $\Phi$ and occur at a rate equal to that at which samples are to be taken of the signal on line 102 by an analog-to-digital encoder 103. In response to each pulse on line 107, analog-to-digital encoder 103 samples the video signal presented at its input on line 102 and provides a digital word at its output on bus 108 the value of which is an indication of the amplitude of the sample. Accordingly, during each line of video provided from source 101 a plurality of digital words representing the amplitudes at sampled points along the line of video are presented on bus 108 and the digital words representing the location of each of the amplitude samples on bus 108 are simultaneously provided on bus 106.

Each digital word on bus 108 is presented to one input of a subtractor circuit 109, the other input of which is connected to the output of a transmission gate circuit 110. In response to each energizing pulse in pulse train Φ on line 107, gate 110 couples the digital word presented at the output of a delay line frame memory 111 to the above-mentioned other input of subtractor circuit 109 by way of bus 112. In a manner which will be more readily apparent after an understanding of the operation of the remainder of the apparatus in FIG. 1 is obtained, delay line frame memory 111 presents a digital word at its output which represents the video amplitude for the same spatial point in a picture as that represented by the digital word on bus 108. The digital words provided by frame memory 111, however, correspond to video amplitudes which were present in the picture during a previous video frame.

The difference between the digital word on bus 108 and the digital word on bus 112 from gate 110 is provided by subtractor circuit 109 by way of bus 113 to the input of a threshold logic circuit 114 and to the input of a transmission gate 115. If this difference is greater than the predetermined threshold level built into threshold logic circuit 114, circuit 114 provides an energizing signal by way of the line 116 to one input of an AND gate 117. Assuming that the inhibit input of AND gate 117 is not energized, the energizing signal developed on line 116 is coupled through AND gate 117 and then through an OR gate 118 to one input of an AND gate 128. The other input of AND gate 128 is connected by way of line 127 to address generator 105. Line 127 is provided with an energizing signal by generator 105 only during the active region of the video frame, that is, at all times except during the horizontal and vertical blanking intervals. This signal is also coupled to a sync generator 292 in FIG. 1 by way of line 127. Hence, during the active region of the picture, an energizing signal from OR gate 118 is coupled through AND gate 128 both to the control input of a transmission gate 115 and by way of line 119 to the circuitry in FIG. 2. An energizing pulse on line 119 is designated in the drawing as representing a transmit signal, that is, a signal which indicates that an amplitude value has been selected for transmission.

With the control input of transmission gate 115 energized, the difference signal on bus 113 is coupled through gate 115 to one input of an adder circuit 120. The other input of adder circuit 120 is connected to receive the digital word provided by gate 110 on bus 112. Accordingly, the digital word developed by adder circuit 120 on bus 121 is equal in magnitude to the digital word provided on bus 108 when the transmit signal is present on line 119. When the transmit signal is not present on line 119, gate 115 is not energized, and the digital word on bus 121 is identical to the digital word on bus 112. This digital word on bus 121 is coupled to the input of delay line frame memory 111 and also by way of bus 122 to the circuitry in FIG. 2. In this way the digital words circulating in frame memory 111 are constantly updated by the most recent samples taken from the video signal on line 102 by the analog-to-digital encoder 103. It should be noted, however, that the digital word which is reinserted into frame memory 111 by adder circuit 120 is only updated, or changed, in those cases where the transmit signal is generated on line 119.

Figure 2:
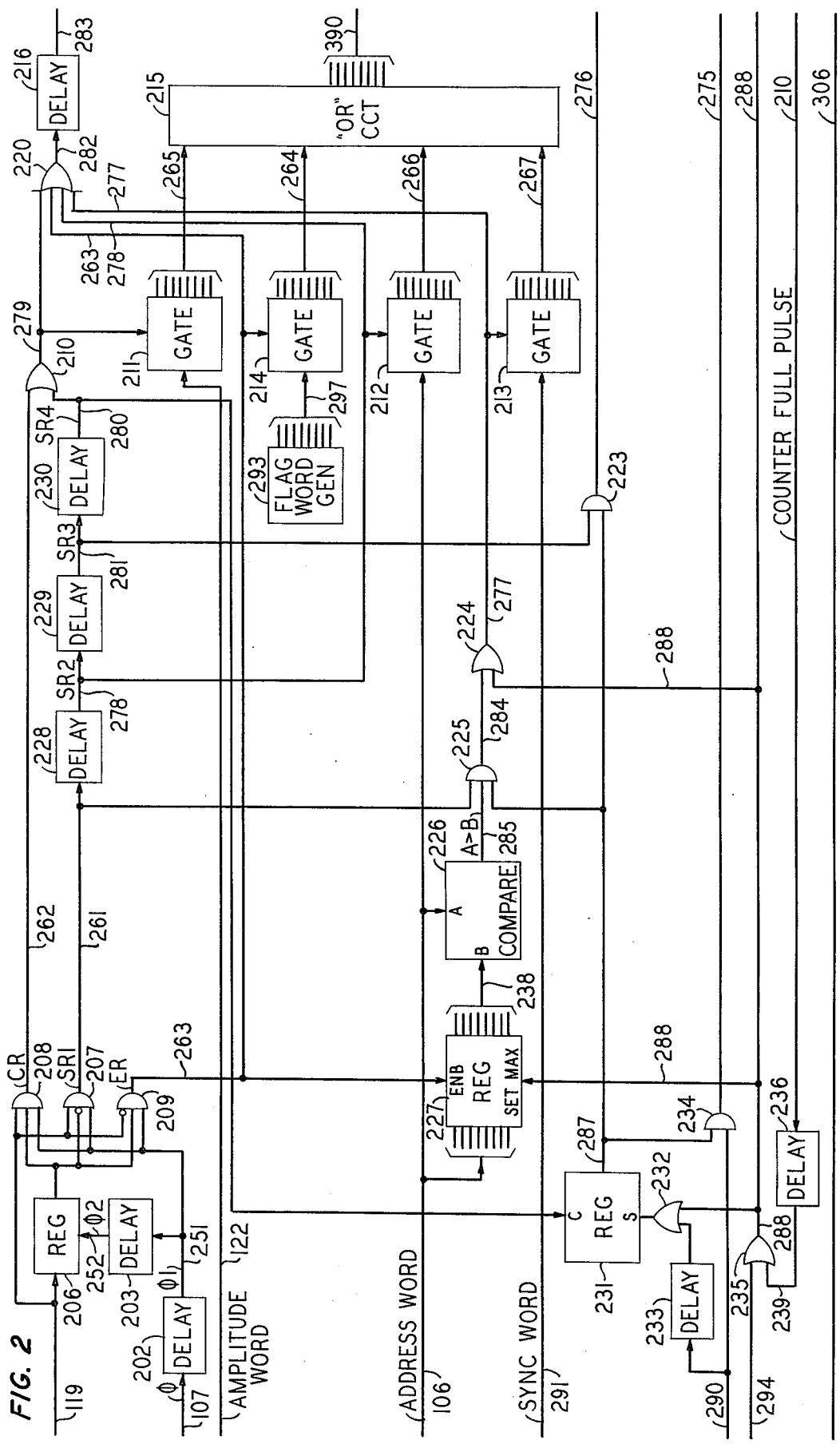

The digital words developed by address generator 105 are coupled to sync generator 292 and to other circuitry in FIG. 2 by way of bus 106. These digital words on bus 106 are referred to hereinafter and in FIG. 2 as address words since their values represent the position along a video line of the amplitude words presented on bus 122. Sync generator 292 in FIG. 1 generates on line 290 during each horizontal blanking period at the end of each active video line a short energizing pulse called hereinafter, and in FIG. 1, the line sync pulse. Sync generator 292 generates a line 294 during each vertical blanking period a short energizing pulse called hereinafter, and in FIG. 1, the frame sync pulse. Finally, sync generator 292 generates on bus 291 a word, hereinafter and in FIG. 2, called the sync word, which assumes a first value during vertical blanking, a second value during horizontal blanking, and a third value during the active region of the picture. The values of the sync word on bus 291 are distinguishable from all address words on bus 106. As pointed out hereinbelow, transmission of the first value of the sync word on bus 291 indicates to the receiver the start of a new frame. Transmission of the second value of the sync word on bus 291 indicates the occurrence of a predetermined number of successive lines containing no samples to be transmitted. Transmission of the third value of the sync word on bus 291 indicates to the receiver the start of a new line in those rare instances when the normal method of line synchronization to be described hereinbelow fails.

At some time during vertical blanking, sync generator 292 produces a short energizing pulse called the frame sync pulse on line 294. The frame sync pulse is coupled through an OR gate 235, and then by way of line 288 to one input of an OR gate 232 whose output is connected to the SET input of a register 231, thereby causing the register 231 to be placed in the SET state. When register 231 is set, an enabling signal is produced on line 287.

The frame sync pulse is also coupled by way of line 288 to the SET MAXIMUM input of a register 227. This causes the output word of register 227 on bus 238 to be set to its maximum possible value.

The frame sync pulse is also coupled by way of line 288 to an OR gate 224 which, as will be described hereinbelow, when energized by the frame sync pulse during the vertical blanking interval causes the first value of the sync word on bus 291 to be transmitted. As pointed out hereinabove, this first value indicates to the receiver that a new frame has begun. After passing through OR gate 224, the frame sync pulse appears on line 277. The appearance of an energizing signal on line 277 causes the control input of a transmission gate 213 to be energized. With transmission gate 213 energized, the sync word on bus 291 is coupled through gate 213 by way of bus 267 to an input of OR circuit 215. OR circuit 215 is actually constructed of a plurality of OR gates, one for each of the bit positions in the words provided by the buses to the input of OR circuit 215. Each one of the OR gates has inputs equal in number to the number of inputs of OR circuit 215. The inputs of each OR gate are connected to the bit position corresponding to that OR gate in all of the digital words connected to the inputs of OR circuit 215. The sync word provided on bus 267 is coupled by the OR circuit 215 and bus 390 to the input of a word-to-bit converter 217.

The energizing pulse on line 277 is also coupled to an input of OR gate 220, whereupon it is coupled by way of line 282 and after a short time interval determined by delay 216 coupled by way of line 283 to the enable input of word-to-bit converter 217. The appearance of an energizing pulse on line 283 causes word-to-bit converter 217 to couple the word at its input on bus 390 one bit at a time to its output on line 270. Accompanying each data bit on line 270 the word-to-bit converter 217 produces an energizing pulse on line 268.

Figure 3:
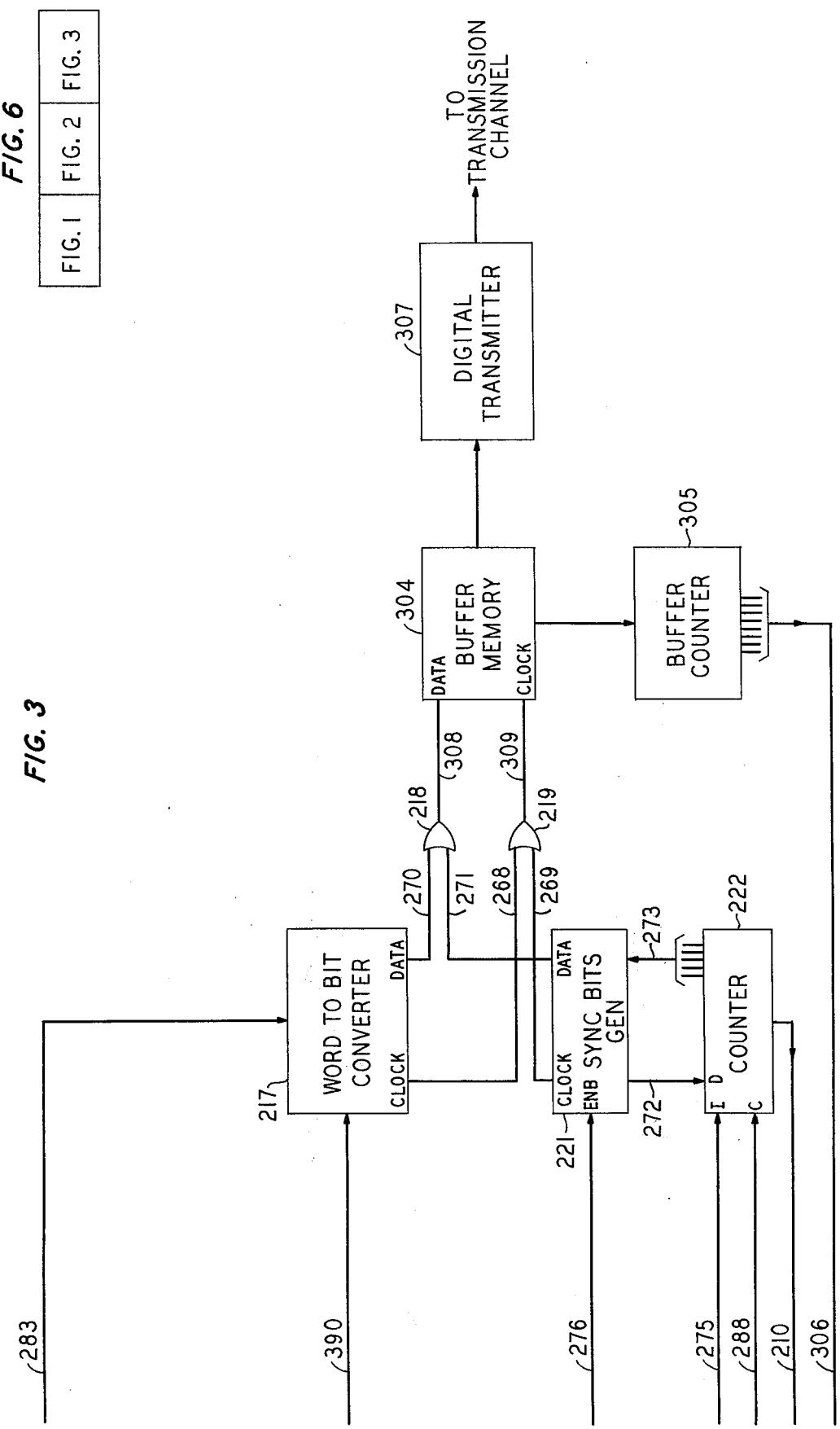

The data bits on line 270 and their corresponding energizing pulses on line 268 are coupled through OR gates 218 and 219, respectively, to the buffer memory 304 in FIG. 3 by way of lines 308 and 309, respectively. The data bits on line 308 are temporarily stored in buffer memory 304 until such time as they can be sent to the transmission channel via digital transmitter 307. The buffer memory 304 then provides its contents bit-by-bit on a first-in-first-out basis to the digital transmitter 307 for transmission.

The frame sync pulse is also coupled by way of line 288 to the CLEAR input of a counter 222. This causes the output word of counter 222 on bus 273 to be reset to zero. Counter 222 counts the number of video lines containing no samples to be transmitted, which have occurred since the last transmission of either picture data or sync words. It accomplishes this tank as follows. As long as no sample has been selected for transmission, register 231 will remain in the SET state, thus causing an enable signal to appear on line 287. During the horizontal blanking period at the end of each active video line, sync generator 292 produces the line sync pulse on line 290. As long as line 287 carries an enable signal due to register 231 being set, the line sync pulse passes through AND gate 234, along line 275 to an INCREMENT input of counter 222 which causes the value of the output word of counter 222 on bus 273 to be increased in value by one. If during some horizontal blanking period after an active video line the counter 222 reaches a predetermined maximum value known at the receiver, then the counter 222 produces on line 210 a short energizing pulse, hereinafter and in FIG. 2, called the counter-full pulse. The counter-full pulse is coupled by way of line 210 and, after a short time interval determined by delay 236, is coupled by way of line 239 to a second input of OR gate 235. The counter-full pulse then causes the occurrence of the same events as did the frame sync pulse described hereinabove, except that the second value of the sync word on bus 291 is not transmitted during the horizontal blanking period, thus indicating to the receiver the occurrence of the predetermined number of lines containing no transmitted samples.

As pointed out hereinabove, each time that an energizing pulse in pulse train $\Phi$ appears on line 107, a sample is taken of the video signal on line 102 and the amplitude and address of that sample are presented in digital form on buses 122 and 106, respectively. In FIG. 2 each energizing pulse on line 107 is coupled through a delay circuit 202 to provide an energizing pulse on line 251, designated in FIG. 2 as belonging to pulse train $\Phi_1$. Each energizing pulse on line 251 is then coupled through a delay circuit 203 to provide an energizing pulse on line 252, designated in FIG. 2 as belonging to pulse train $\Phi_2$. The delay in circuits 202 and 203 is short enough so that the pulses appear on lines 251 and 252 before the next appearance of an energizing pulse on line 107. As a result, each sampling interval during which the amplitude word and address word for a particular sample appear on buses 122 and 106, respectively, is divided into three subintervals. These subintervals are referred to hereinbelow as a first subinterval equal to the period of time between the rise of the pulse on line 107 in pulse train $\Phi$ and the rise of the pulse on line 251 in pulse train $\Phi_1$; a second subinterval equal to the period of time between the rise of the pulse on line 251 and the rise of the pulse on line 252 in pulse train $\Phi_2$; and finally, a third subinterval equal to the period of time between the rise of the pulse on line 252 and the rise of the next pulse in pulse train $\Phi$ on line 107.

The transmit signal on line 119, if present, is present for the entire duration of the sampling interval. This transmit signal is connected to the input of a register 206 which is energized by the energizing pulse on line 252 thereby causing the register 206 to be either set or cleared by the pulse in pulse train $\Phi_2$ depending on whether or not a transmit signal is present on line 119. If the transmit signal is present, register 206 is set during the third subinterval, whereas if the transmit signal is not present, register 206 is cleared during the third subinterval of a sampling period.

The transmit signal on line 119 is also connected to an input of each of two AND gates 207 and 208 and is also connected to the inhibit input of an AND gate 209. The output from register 206 which provides an energizing signal when register 206 is in its set state, is connected to an inhibit input of AND gate 207 and to an input of each of the AND gates 208 and 209. Each of the AND gates 207, 208 and 209 have a third input connected to the output of delay circuit 202 to receive the energizing pulse in pulse train $\Phi_1$.

If a transmit signal is not present on line 119 during a sampling interval, the energizing pulse on line 252 will clear register 206 during the third timing subinterval. If then a transmit signal is present on line 119 during the next sampling interval AND gate 207 will be energized by the pulse on pulse train $\Phi_1$ on line 251 during the second timing subinterval. During this second subinterval, the transmit signal on line 119 has not yet been effective in setting register 206 since the register is set or cleared only during the third subinterval when the pulse is present in pulse train $\Phi_2$. Accordingly, an energizing signal from the output of register 206 is not present during this second timing subinterval and therefore AND gate 208 is not energized. AND gate 209 is also not energized since it is inhibited by the presence of the transmit signal on line 119. As a result, the presence of a transmit signal on line 119 following a sampling period during which no such transmit signal was present causes AND gate 207 to be energized and produce an energizing signal on line 261, designated in the drawing by the letter SR1 to indicate a start-of-run.

During the third timing subinterval of the sampling period when a transmit signal first appears on line 119, register 206 will be set by the pulse in pulse train $\Phi_2$. The energizing signal produced at this time at the output of register 206 will have no immediate effect on AND gates 207 through 209 since they are only energized during the second timing subinterval.

If a transmit signal appears on line 119 following a sampling period during which a transmit signal had been present on line 119, AND gate 208 will be energized during the second timing interval by the pulse in pulse train $\Phi_1$. The energizing signal produced at the output of AND gate 208 on line 262 is designated in the drawing by the letter CR to indicate a continuing run. AND gates 207 and 209 will not be energized during this sampling period since the energizing signal from register 206 inhibits AND gate 207 and the transmit signal on line 119 inhibits AND gate 209. During this second sampling period when the transmit signal is present on line 119, register 206 however will again be set during the third timing subinterval by the pulse in pulse train $\Phi_2$. Accordingly, AND gate 208 will continue to produce continuing run signals on line 262 (designated as CR in FIG. 2) for succeeding sampling periods as long as transmit signals continue to be present on line 119.

When a sampling period occurs during which a transmit signal is no longer present on line 119, AND gate 209 is energized by the pulse in pulse train $\Phi_1$ during the second timing subinterval to produce an energizing signal on line 263 which is designated in the drawing by the letters ER to indicate an end-of-run. AND gates 207 and 208 will not be energized during this sampling period since the output from register 206 will still inhibit AND gate 207 during the second timing subinterval and AND gate 208 will not be energized since the transmit signal is no longer present on line 119.

In summary, the first appearance of a transmit signal on line 119 will cause a start-of-run signal to appear on line 261. If the transmit signal continues to be present in succeeding sampling periods, a continuing run signal is produced on line 262 during each of these succeeding sampling periods. An end-of-run signal is produced on line 263 during the first sampling period when the transmit signal is no longer present on line 119.

The appearance of start-of-run signal SR1 on line 261 causes, after a time interval determined by delay 228, the appearance on line 278 of an energizing pulse hereinafter and in FIG. 2 called SR2. The appearance of signal SR2 on line 278 causes, after a time interval determined by delay 229, the appearance on line 281 of an energizing pulse hereinafter and in FIG. 2 and SR3. The appearance of signal SR3 on line 281 causes, after a time interval determined by delay 230, the appearance on line 280 of an energizing pulse hereinafter and in FIG. 2 called SR4. In a sampling period, pulse SR4 on line 280 occurs before the corresponding pulse $\Phi_2$ on line 252.

As described hereinabove, after the occurrence of the frame sync pulse on line 294 and before the occurrence of an ER pulse on line 263, register 227 produces as its output word on bus 238 its maximum possible value. This value is larger than all of the possible values of the address word on bus 106. The output word of register 227 is coupled by way of bus 238 to the B input of a comparator 226. The address word on bus 106 is coupled to the A input of comparator 226. Comparator 226 produces an enabling signal on line 285 if the value at its A input (the address word on bus 106) exceeds the value at its B input (the output word of register 227 on bus 238). After the occurrence of a frame sync pulse on line 294 and before the occurrence of an ER pulse on line 263, the value on bus 238 at the B output of comparator 226 is at its maximum value. Thus, during this time, the value at the A input of comparator 226 cannot exceed the value at the B input of comparator 226, and the comparator 226 produces a disabling signal on line 285 which in turn disables AND gate 225.

Signal SR1 is coupled to another input of AND gate 225 by way of line 261. During the appearance of the first SR1 signal of a video frame on line 261, however, AND gate 225 is disabled by the signal on line 285 as described hereinabove. Thus, the first SR1 signal of a video frame causes no action except the production of signal SR2 on line 278 as described hereinabove. The appearance of start-of-run signal SR2 on line 278 causes the control input of transmission gate 212 to be energized. With transmission gate 212 energized, the address word on bus 106 is coupled through gate 212 by way of bus 266 to a second input of OR circuit 215. The signal SR2 is also coupled to an input of OR gate 220, whereupon it causes the transmission of the address word on bus 266 in exactly the same manner as was described hereinabove for the transmission of sync words on bus 267. Transmission of the address word on bus 266 to the buffer memory 304 is completed before the occurrence of start-of-run signal SR3 on line 281.

Signal SR3 on line 281 is coupled to one input of AND gate 223. The output signal of register 231 is coupled to the other input of AND gate 223 by way of line 287. During the appearance of the first SR3 signal of a video frame on line 281, register 231 is in a set state as described hereinabove. Thus, an enabling signal is present on line 287, and the first SR3 signal of a video frame appearing on line 281 passes through AND gate 223 and is coupled to the enable input of sync bits generator 221 by way of line 276. As described hereinabove, during the appearance of the first SR3 signal of a video frame on line 276, the output value of counter 222 appearing on bus 273 represents the number of video lines containing no transmitted samples which have occurred since the most recent transmission of the sync word on bus 291. This counter output value is coupled to sync bits generator 221 by way of bus 273.

Appearance of an energizing signal on line 276 causes sync bits generator 221 to produce at its output on line 271 a sequence of binary digits, one bit at a time, each digit being accompanied by an energizing pulse on line 269. The value of each binary digit output by sync bits generator 221 on line 271 is determined as follows: if the counter value appearing on bus 273 is nonzero, sync bits generator produces a binary one on line 271, an energizing pulse on line 269 and an energizing decrement pulse on line 272 which is coupled to counter 222. The appearance of an energizing decrement pulse on line 272 causes the output of counter 222 appearing on bus 273 to be reduced in value by one. If the counter value appearing on bus 273 is zero, sync bits generator 221 produces only a binary zero on line 271 and an energizing pulse on line 269. Output from sync bits generator 221 then ceases. The data bits on line 271 and their corresponding energizing pulses on line 269 are coupled through OR gates 218 and 219, respectively, to the buffer memory 304 in FIG. 3 for transmission in exactly the same manner as was described hereinabove for the output of word-to-bit converter 217. Transmission of data bits on line 271 to buffer memory 304 is completed before the occurrence of start-of-run signal SR4 on line 280.

Start-of-run signal SR4 is coupled by way of line 280 and OR gate 210 to line 279. The appearance of an energizing signal on line 270 causes the control input of transmission gate 211 to be energized. With transmission gate 211 energized, the amplitude word on bus 122 is coupled through gate 211 by way of bus 265 to a third input of OR circuit 215. The energizing signal on line 279 is also coupled to an input of OR gate 220, whereupon it causes the transmission of the amplitude word on bus 265 in exactly the same manner as was described hereinabove for the transmission of sync words on bus 267 and address words on bus 266. Transmission of the amplitude word on bus 265 to the buffer memory 304 is completed before the occurrence of $\Phi_2$ on line 252.

Start-of-run signal SR4 is also coupled by way of line 280 to the clear input of register 231. The appearance of an energizing signal on line 280 causes register 231 to be cleared and a disabling signal to appear on line 287. The action of the coder during the first sampling period of the frame which contains a picture sample to be transmitted is completed when energizing pulse $\Phi_2$ occurs on line 252 and causes register 206 to be set due to the presence of a transmit signal on line 119.

During the next sampling period when the next energizing pulse appears on line 107 and new amplitude and address words appear on bus 122 and 106, respectively, another transmit signal on line 119 will no longer cause AND gate 207 to be energized since its inhibit input is energized by the output of register 206. Instead, the energizing pulse on line 251 causes AND gate 208 to be energized thereby producing an energizing pulse on line 262 which indicates that the run of samples to be transmitted is continuing. This energizing pulse on line 262 is coupled through OR gate 210 to line 279 and causes the amplitude word on line 122 to be transmitted in exactly the same manner as was described hereinabove for the transmission of amplitude words on line 122, that is, these amplitude words are coupled through gate 211 to OR circuit 215, and then transmitted to buffer memory 304 via word-to-bit converter 217. The appearance of any further amplitude words which correspond to significant changes will cause a similar operation of the circuity shown in FIG. 2.

When the first sample appears which does not require transmission, the absence of an energizing signal on line 119 causes the inhibit input of AND gate 209 to be deenergized. A second input of AND gate 209 is already energized by the output of register 206 which has been previously set during the last sample interval. Consequently, when the energizing pulse in pulse train $\Phi_1$ appears on line 251, the third input of AND gate 209 is energized thereby causing AND gate 209 to provide an energizing pulse ER on line 263 indicating that the run of samples to be transmitted has ended. This energizing pulse ER on line 263 energizes the control input of a transmission gate 214.

The flag word generator 293 provides a digital word on bus 297 to the input of gate 214. As pointed out hereinabove, this flag word produced by generator 293 has the same number of bits as an amplitude word which appears on bus 122 but is distinguishable therefrom in that the word produced by generator 293 has a value which is prohibited from appearing as an amplitude value on bus 122. Hence, when the end-of-run signal ER occurs on line 263, the flag word from generator 293 is coupled through bus 297 to gate 214 and through OR circuit 215 to word-to-bit converter 217, whereupon it is transmitted in exactly the same manner as was described hereinabove for amplitude words, address words and sync words.

In addition to energizing the control input of gate 214, the energizing pulse ER is also coupled to the enable input of register 227 by way of line 263. The address word on bus 106 is coupled to the data input of register 227. The appearance of an energizing ER pulse on line 263 causes the address word on bus 106 to be read into register 227 and to appear at its output on bus 238. Register 227 then holds its output on bus 238 constant until either another ER pulse occurs on line 263 or a Set-Maximum pulse appears on line 288 as described hereinabove.

In summary, starting at the beginning of each video frame, counter 222 counts the number of video lines containing no sample to be transmitted. The first sample of a group of samples selected to be transmitted causes a start-of-run pulse SR1 to be generated by gate 207, which in turn causes the generation, one after the other, of pulses SR2, SR3 and SR4 before the occurrence of another video sample. SR1 has no effect on AND gate 225 at this point since the address of the first sample in the video frame selected for transmission will necessarily be lower in value than the maximum value provided on bus 238 by register 227. SR2 causes the address word corresponding to that sample to be transmitted into the buffer memory. SR3 causes a string of binary ones equal in number to the value of counter 222 to be transmitted to the buffer memory, followed by a single binary zero to signal termination of the string. The counter 222 is then reset to zero and resumes counting video lines containing no samples to be transmitted, SR4 causes the amplitude word corresponding to that sample to be transmitted. If the next sample has also been selected for transmission, a continuing run pulse is generated thereby indicating that the run of samples to be transmitted is continuing. This continuing run pulse from AND gate 208 causes only the amplitude word from this second sample to be loaded into the buffer memory. Finally, when a sample occurs which has not been selected for transmission, an end-of-run pulse is generated by AND gate 209 thereby causing a flag word to be read out of generator 293 into the buffer memory. The address word corresponding to the video sample causing the end-of-run pulse is stored in register 227 for later use in a manner to be described hereinbelow.

During the remainder of the first video line containing samples to be transmitted, register 231 is in a clear state as described hereinabove causing a disable signal to appear on line 287 which in turn disables AND gates 223, 234 and 225, respectively. Each additional run of samples to be transmitted in this video line causes the generation by gate 207 of an SR1 pulse on line 261 which in turn causes the generation of pulses SR2, SR3 and SR4 as described hereinabove. However, SR1 on line 261 has no effect on AND gate 225 because it is disabled. SR2 on line 278 causes the address word on bus 106 to be transmitted as described hereinabove. SR3 on line 281 has no effect on gate 223 because it is disabled. SR4 on line 280 causes the amplitude word on bus 102 to be transmitted as described hereinabove. CR pulses on line 262 and ER pulses on line 263 cause the same action as described hereinabove.

In summary, in the first video line containing samples to be transmitted all runs of samples to be transmitted except the first run are transmitted by sending the address word corresponding to the first sample in the run, followed by the amplitude words corresponding to the samples in the run, followed by the end-of-run flag word. Each end-of-run signal causes the corresponding address word on bus 106 to be read into register 227. Thus, at the end of the line, register 227 has as its output on bus 238 the address value of the most recent sample to cause an end-of-run signal, that is, the rightmost end-of-run sample in the line.

During the horizontal blanking period following the first line containing transmitted samples, a line sync pulse appears on line 290. Since gate 234 is disabled during the first line containing transmitted samples, no energizing pulse appears on line 275. A short time later, as determined by delay 233, the line sync pulse is coupled through OR gate 232 to the set input of register 231, thus causing the register 231 to be placed in the set state in exactly the same manner as described above for the frame sync pulse. Register 231 being in the set state causes an enabling signal to appear on line 287. Register 231 remains in the set state until the next occurrence of a sample to be transmitted.

During the horizontal blanking periods following subsequent video lines containing no samples to be transmitted, the line sync pulses occurring on line 290 are coupled through the enabled AND gate 234 along line 275 to the increment input of counter 222 which causes the counter 222 value to be increased by one. Thus, in this way, counter 222 counts the number of video lines containing no transmitted samples. If counter 222 reaches some predetermined maximum value known also at the receiver, then a energizing pulse appears on line 210 which causes the transmission of the second value of the sync word on bus 291 during horizontal blanking in exactly the same manner as described hereinabove.

The first occurrence of a transmit signal on line 119 in a video line which is not the first video line containing transmitted samples causes the occurrence of SR1, SR2, SR3 and SR4 pulses in the same manner as described hereinabove. If the most recent item to be transmitted to the buffer was the second value of the sync word on bus 291 during horizontal blanking, then register 227 has as its output on bus 238 its maximum value as described hereinabove, and the circuitry in FIG. 2 behaves in exactly the same manner as described hereinabove for the first video line of the frame containing samples to be transmitted.

If the most recent item to be transmitted to the buffer was not a sync word on bus 291, then it was an end-of-run flag word on bus 297. In this case, register 227 has as its output on bus 238 the address along the video line of the sample which caused the most recent end-of-run signal to be generated by gate 209 as described hereinabove. This address on bus 238 is designated hereinafter and in FIG. 2 as B.

Each address word on bus 106 is coupled to one input of comparator 226. This address value at the one input of comparator 226 is hereinafter and in FIG. 2 designated as A and represents the position of each sample along the video line. The output of register 227 (address B) is coupled to the other input of comparator 226 by way of bus 238. The value of address B on bus 238 is either at its maximum value due to the last item transmitted being a sync word on bus 291, or the value of address B represents the position along a video line of the video sample causing the most recent end-of-run pulse on line 263. In either event, during the first occurrence in a video line of start-of-run signal SR1 on line 261, if, as is usually the case, the address A value on bus 106 is to the left of (and therefore less than) or equal to the address B value on bus 238, then the receiver is able to deduce from this address information alone that a new video line has occurred. No synchronization information need be transmitted except to indicate the number of immediately preceding video lines containing no transmitted samples as described hereinabove.

In the rare event that during the first occurrence in a video line of start-of-run signal SR1 on line 261 the address A value on bus 106 is to the right of the address B value on bus 238, then the receiver cannot deduce that a new video line has begun unless additional information is transmitted. Under these circumstances, comparator 226 outputs an enabling signal on line 285 since the address value at the A input of comparator 226 exceeds the address value at the B input of comparator 226. During the first occurrence in a video line of start-of-run signal SR1 on line 261, register 231 is in the set state as described hereinabove, and therefore an enabling signal appears on line 287 which is an input to AND gate 225. Thus, during the first occurrence in a video line of start-of-run signal SR1 on line 261 which is also an input to AND gate 225, if address A value on bus 106 exceeds address B value on bus 238 thus causing comparator 226 to output an enabling signal on line 285, then since an enabling signal also appears on line 287, energizing pulse SR1 on line 261 passes through AND gate 225 and appears on line 284. Any energizing pulse on line 284 is coupled through OR gate 224 to line 277 and causes the transmission of the above-mentioned third value of the sync word on bus 291 during the active time of the picture. This value of the sync word is distinguishable from the value of the sync word which is transmitted during horizontal blanking and from the value of the sync word which is transmitted during vertical blanking. During the remainder of the video line the circuitry in FIG. 2 behaves in exactly the same manner as described hereinabove for the first video line containing samples to be transmitted.

Figure 4:
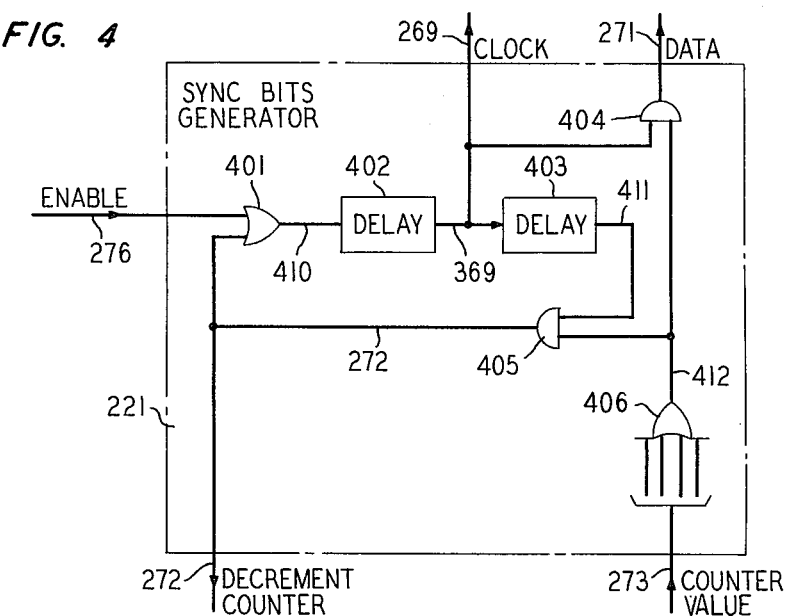
FIG. 4 is a schematic block diagram of one of the word-to-bit converters shown as a block in FIG. 3.

Many circuits are well known to those skilled in the art to implement the various functions described hereinabove for the apparatus shown as boxes in FIGS. 1 through 3. Examples of two circuits that have been designed for use as the sync bits generator 221 and the word-to-bit converter 217 are shown in FIGS. 4 and 5 of the drawing, respectively.

As pointed out hereinabove, an enable pulse is present on line 276 for every SR3 pulse which corresponds to the first selected sample in a video line. This enable pulse on line 276 is coupled, in FIG. 4, to one input of an OR gate 401, thereby producing an energizing pulse at the input of a delay circuit 402. Delay circuit 402 provides a delay which is slightly in excess of the time required for the counter circuit 222 to react to a decrement pulse on line 272. When an energizing pulse appears at the output of delay circuit 402, it is coupled directly to line 269 to serve as a clock pulse and also coupled to one input of AND gate 404. A second input of AND gate 404 is connected to the output of an OR gate 406 which has one input connected to each of the digital positions provided at the output of counter circuit 222 on bus 273. If the digital word present on bus 273 is a non-zero value the second input of AND gate 404 is energized and the energizing pulse at the output of delay circuit 402 is coupled directly through AND gate 404 to appear as a data pulse on line 271.

The output circuit of OR gate 406 is also coupled to one input of an AND gate 405, a second input of which is connected to receive the energizing pulse from the output of delay circuit 402 after that pulse has been delayed in a delay circuit 403. If the output of counter circuit 222 has a non-zero value, AND gate 405 will also be energized, thereby causing an energizing pulse to be coupled both to the decrement input of counter circuit 222 by way of line 272 and also to a second input of OR gate 401. This energizing pulse at the second input of OR gate 401 causes the same action as an original enabling pulse on line 276 except that the action now takes place with a value at the output of counter circuit 222 which has been reduced in value by 1. The entire procedure continues in this feedback fashion until the output of counter circuit 222 provides digital "0s" in all bit positions of bus 273. At this point a clock pulse is still produced on line 269 but a digital 0 is provided as data on line 271. In addition, no feedback occurs by way of AND gate 405 because the input of this AND gate which is connected to OR gate 406 is not energized. In this way the sync bits generator 221 in FIG. 4 provides a sequence of digital "1s" on line 271 equal in number to the initial value provided on bus 273 at the output of counter circuit 222, and this sequence of digital "1s" is terminated by a digital 0.

Figure 5:
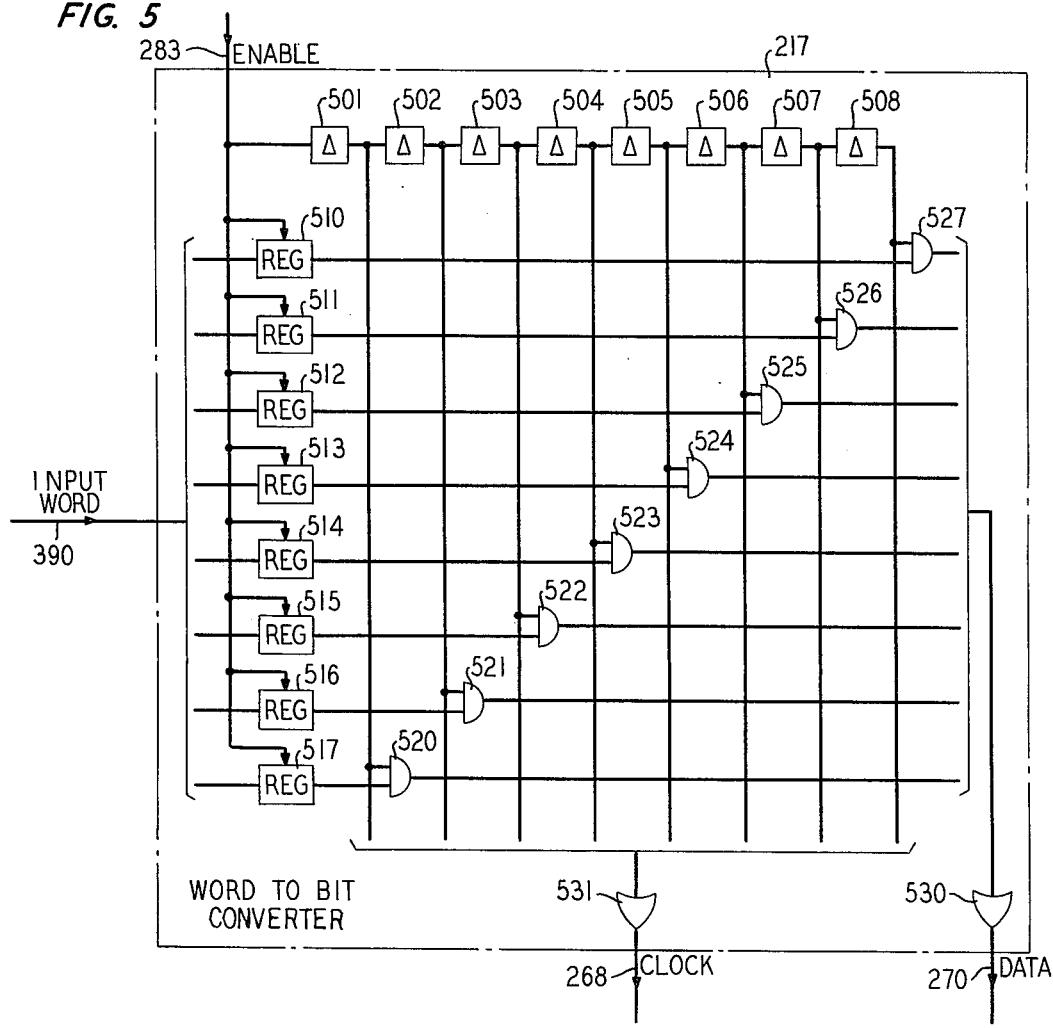
FIG. 5 is a schematic block diagram of one of the sync bits generators shown as a block in FIG. 3.

In FIG. 5 the enable pulse present on line 283 is coupled both to the input of a tapped delay line consisting of delay circuits 501 through 508 and to the read inputs of register circuits 510 through 517. One register circuit is present for each of the bit positions provided on bus 390 at the output of OR gate 215. Upon receiving an enable pulse on line 283, each of the register circuits 510 through 517 stores the digital bit present on its corresponding line in bus 390. Each output of the register circuits 510 through 517 is coupled to one input of a corresponding AND gate in the group of AND gates 520 through 527. The output of each delay circuit in the tandem connection of delay circuits 501 through 508 is connected to a second one of the inputs of AND gates 520 through 527, respectively. As a result, AND gates 520 through 527 are sequentially energized by the enable pulse when it appears at the output of the various delay circuits 501 through 508. The outputs of AND gates 520 through 527 are each coupled to an input of a multiple-input OR gate 530. The sequential energization of AND gates 520 through 527 therefore results in the production of digital bits at the output of OR gate 530 on line 270 which correspond to the digital bits stored in registers 510 through 517. Finally, the enable pulse present at the output of each of the delay circuits 501 through 508 is coupled through a multiple-input OR gate 531 to provide a clock pulse on line 268 for each data bit present on line 270.

In summary, no synchronization word is transmitted in the present invention to line synchronize the transmitting encoder with the receiving decoder. A sync word of a distinguishable value is transmitted only in the following instances: during the vertical blanking interval in order to provide frame synchronization; during the horizontal blanking interval, but only when counter circuit 222 has generated an indication that it is full; and finally, during the interval preceding the address word of the first sample in a video line to be selected for transmission, but only if that first sample has an address which is later in the video line than the address word of the previously transmitted sample. The conditions under which the last type of sync word is transmitted very rarely occur in a redundancy reduction system being utilized to transmit video signals generated in a video-telephone system. Normally, when movement occurs in the picture, the first sample in a video line selected for transmission has an address value which is earlier in the video line than the address for the previously transmitted sample.

In order to provide an indication to the receiver that video lines have been considered at the transmitter for which no samples have been selected for transmission, a digital bit sequence is caused to be transmitted after the address word of the first sample selected for transmission in a video line. This digital bit sequence indicates by the number of digital "1s" present in the sequence the number of video lines for which no samples have been selected for transmission.

Numerous modifications can be made of the apparatus by those skilled in the art without departing from the spirit and scope of the present invention. For example, the digital bit sequenc can, of course, use digital bits of an opposite value to indicate the numbr of video lines having no samples selected for transmission. In addition, features of the invention may be utilized without incorporating the invention in its totality. For example, samples may be forcibly transmitted even though not selected in order to consistently provide a first selected sample in a video line whose address is earlier in the video line than the address of the previously selected sample. In this way no sync word need be transmitted during the active time in order to indicate that the first sample in the video line has an address later in the video line than the address word of the previously selected sample.

I claim:

1. In a conditional replenishment video encoder wherein only selected samples are transmitted to a receiving location and each selected sample is located by a corresponding address word which represents by its value the position of the selected sample in a video line, apparatus for maintaining line synchronization comprising means for counting the number of sequential video lines wherein no samples have been selected for transmisison, means for detecting a first sample in a video line to be selected for transmission, means for coupling the address word corresponding to said selected sample to a transmission medium, and means responsive to said detecting means for coupling a bit sequence to said transmission medium in bit positions following said address word, the number of bits in said sequence being determined by a value provided at an output of said counter means.

2. Apparatus as defined in claim 1 wherein the encoder further includes means for detecting that the address word corresponding to said first sample in a video line has a predetermined relationship to the address word corresponding to an immediately preceding transmitted sample, and means for transmitting a special sync word prior to said address word of said first video sample in response to an indication that said predetermined relationship exists.

3. Apparatus as defined in claim 2 wherein said means for detecting a predetermined relationship includes a register means for storing an address word corresponding to said immediately preceding transmitted sample, and a comparator circuit having one input connected to receive each address word and a second input connected to receive the address word stored in said register means.

4. Apparatus as defined in claim 3 wherein said means for detecting a predetermined relationship further includes an AND gate having one input connected to receive an output from said comparator circuit and a second input connected to receive an output from said means for detecting a first sample in a video line.

5. In apparatus as defined in claim 1 wherein the encoder includes means for generating an energizing pulse when a sample is selected for transmission, and the means for detecting a first sample includes a register circuit which is set in response to a line synchronizing pulse and is cleared in response to a delayed version of said energizing pulse.

6. Apparatus as defined in claim 5 wherein said means for detecting a first sample further includes an AND gate having one input connected to receive an output from said register circuit and a second input connected to receive a second delayed version of said energizing pulse.

7. Apparatus as defined in claim 6 wherein said means for counting the number of sequential video lines wherein no samples have been selected for transmission includes a counter circuit having an increment and a clear input, means for coupling a frame synchronizing pulse to said clear input, a second AND gate having one input connected to receive an output from said register circuit and a second input connected to receive said line synchronizing pulse, and means for coupling the output of said second AND gate to said increment input of said counter circuit.

8. Apparatus as defined in claim 7 wherein said counter circuit has a second output for providing a signal when the counter circuit reaches a predetermined level in its count, and said conditional replenishment video encoder further includes means for transmitting a special sync word in response to the signal at said second output of said counter circuit.

9. A redundancy reduction encoder for use with a video signal having frame intervals and line subintervals comprising means for developing samples of said video signal, means for generating an address word for each of said samples to indicate by it value the position of the corresponding sample within a line subinterval, means for comparing each sample with a previously stored value in order to generate a transmit signal when the compared sample is selected for transmission, means responsive to said transmit signal for coupling to a transmission medium an amplitude word corresponding to said sample preceded by the address word corresponding to said sample, means for storing an address word corresponding to a previously selected sample, means for comparing an address word of a selected sample with the address word stored in said means for storing, and means responsive to said comparison means for transmitting a special sync word in the bit spaces preceding said address word of a selected sample when a predetermined relationship exists between the compared address word and the stored address word.

10. A redundancy reduction encoder as defined in claim 9 wherein said means for transmitting a special sync word includes a means for indicating the selection of a first sample in a line subinterval, and an AND gate having one input coupled to receive an output from said indicating means, a second input connected to receive an output from said comparison means, and a third input connected to receive said transmit signal.

11. A redundancy reduction encoder as defined in claim 10 wherein said means for indicating the selection of a first sample in a line subinterval includes a register circuit which is set to a predetermined state in response to the termination of either a frame interval or a line subinterval and is cleared in response to a delayed version of said transmit signal.

12. A redundancy reduction encoder for use with video signals having frame intervals and line subintervals comprising means for developing amplitude samples of said video signals, means for generating an address word for each amplitude sample which indicates by its value the position of its corresponding amplitude sample within the line subinterval, means for comparing each amplitude sample with a previously stored value in order to generate a transmit signal when the compared sample is selected for transmission to a receiving location, means responsive to said transmit signal for coupling a selected amplitude sample and its corresponding address word to a transmission channel, counter means responsive to the termination of each of said line subintervals and to the generation of transmit signals from said comparison means for counting the number of line subintervals in which no samples are selected for transmission, means for indicating the selection of a first amplitude sample in a line subinterval, and means responsive to an output from said indicating means for coupling a bit sequence to said transmission medium in bit spaces following the address word corresponding to said first amplitude sample, the number of bits in said sequence being a function of the value developed by said counter means.

13. A redundancy reduction encoder as defined in claim 12 wherein said means for indicating the selection of a first amplitude sample in a line subinterval includes a register circuit which is set in response to the termination of either a frame interval or a line subinterval and is cleared in response to a delayed version of said transmit signal.

14. A redundancy reduction encoder as defined in claim 13 wherein said means for coupling a bit sequence to said transmission medium includes an AND gate having one input connected to an output of said means for indicating and a second input connected to receive a second delayed version of said transmit signal.

15. A redundancy reduction encoder as defined in claim 13 wherein said counter means includes a counter circuit having an output which provides an energizing signal when the counter circuit reaches a predetermined count, and means for coupling said energizing signal to a set input of said register circuit.

16. A redundancy reduction encoder as defined in claim 15 wherein said counter circuit has an increment input and a clear input, and said counter means further includes an AND gate having one input connected to the output of said register circuit and a second input connected to a line sync pulse which indicates the termination of a line subinterval, and means for coupling a frame sync pulse to the clear input of said counter circuit.

* * * * *